(12) United States Patent
Brackenridge et al.

(10) Patent No.: US 7,935,373 B2
(45) Date of Patent: May 3, 2011

(54) PACKAGING OF MEAT PRODUCTS WITH MODIFIED ATMOSPHERES AND/OR ENHANCERS

(75) Inventors: Ann W. Brackenridge, Benton, KS (US); Curtis Cundith, Wichita, KS (US); Scott J. Eilert, Wichita, KS (US); Nancy Rathje, Wichita, KS (US); Barney Wilborn, Auburn, AL (US); David C. Ruzek, Austin, MN (US); Forrest D. Dryden, Austin, MN (US); Bruce C. Paterson, Marshall, MN (US)

(73) Assignees: Cargill, Incorporated, Wayzata, MN (US); Hormel Foods, LLC, Austin, MN (US)

( * ) Notice: Subject to any disclaimer, the term of this patent is extended or adjusted under 35 U.S.C. 154(b) by 1542 days.

(21) Appl. No.: 11/150,593

(22) Filed: Jun. 10, 2005

(65) Prior Publication Data
US 2006/0073244 A1  Apr. 6, 2006

Related U.S. Application Data

(60) Provisional application No. 60/578,802, filed on Jun. 10, 2004, provisional application No. 60/579,624, filed on Jun. 15, 2004, provisional application No. 60/580,341, filed on Jun. 15, 2004, provisional application No. 60/584,513, filed on Jul. 1, 2004, provisional application No. 60/584,794, filed on Jul. 1, 2004.

(51) Int. Cl.
*B65B 25/06* (2006.01)
*A23B 7/152* (2006.01)

(52) U.S. Cl. .......................... 426/129; 426/106
(58) Field of Classification Search .................. 426/124, 426/129, 315, 316, 415, 418
See application file for complete search history.

(56) References Cited

U.S. PATENT DOCUMENTS

| | | | |
|---|---|---|---|
| 3,122,748 A | 2/1964 | Beebe, Jr. | |
| 3,459,117 A | 8/1969 | Koch et al. | |
| 3,882,259 A * | 5/1975 | Nohara et al. | 428/36.7 |
| 3,930,040 A | 12/1975 | Woodruff | |
| 4,089,983 A | 5/1978 | Hood | |
| 4,522,835 A * | 6/1985 | Woodruff et al. | 426/264 |
| 5,514,392 A * | 5/1996 | Garwood | 426/106 |
| 5,916,613 A | 6/1999 | Stockley, III | |
| 5,965,184 A | 10/1999 | Schaefer et al. | |
| 5,989,610 A | 11/1999 | Ruzek | |
| 6,042,859 A | 3/2000 | Shaklai | |
| 6,061,998 A * | 5/2000 | Gorlich | 53/432 |
| 6,270,829 B1 | 8/2001 | Shaklai | |
| 6,331,322 B1 | 12/2001 | Shih et al. | |
| 6,521,275 B1 | 2/2003 | Mercogliano et al. | |
| 2002/0197425 A1 | 12/2002 | Wolf et al. | |
| 2003/0054072 A1 | 3/2003 | Merriman et al. | |
| 2003/0054073 A1 | 3/2003 | DelDuca et al. | |
| 2003/0134013 A1 | 7/2003 | Noel et al. | |
| 2003/0165602 A1 | 9/2003 | Garwood | |
| 2004/0009273 A1 | 1/2004 | Shaklai | |
| 2005/0025865 A1 | 2/2005 | Foulke, Jr. | |

FOREIGN PATENT DOCUMENTS

| | | |
|---|---|---|
| GB | 1589501 | 5/1981 |
| GB | 2264220 | 8/1993 |
| JP | 1178216 | 7/1989 |
| JP | 5003752 | 1/1993 |
| JP | 2001178216 | 7/2001 |
| WO | WO-9633096 | 10/1996 |
| WO | WO-03063599 | 8/2003 |
| WO | WO-2007005772 | 1/2007 |

OTHER PUBLICATIONS

"Application for Assessment of the Food Additive Carbon Mono (CO) Prior to its Authorization." Norwegian Food Control Authority. 16 pages.
"Microbiological Safety of Controlled and Modified Atmosphere Packaging of Fresh and Fresh-Cut Produce." U.S. Food and Drug Administration: Center for Food Safety and Applied Nutrition. Sep. 30, 2001. 46 pages.
"Norwegian Application for Low Percentage Usage of CO in Modified Atmosphere Pakaging (MAP) for Fresh Meat—International Lobbying." Jul. 5, 2002.
"Notification of Claim for General Recognition of Safety of Carbon Monoxide in a Modified Atmosphere System for Packaging Fresh Meat." Pactiv Corporation. 55 pages. Aug. 29, 2001.
"Postharvest Handling Systems: minimally processed fruits and vegetables." University of California: Cooperative Extension. <url: http://vric.ucdavis.edu/selectnewtopic.minproc.htm>. Jun. 11, 2002.
Eckert, LA et al. "Sensory, Microbial and Chemical Characteristics of Fresh Aerobically Stored Ground Beef Containing Sodium Lactate and Sodium Propionate." Institute of Food Technologists. Abstract only. 1 page, Apr. 2003.
Fontes, P.R. et al. "Color evaluation of carbon monoxide treated porcine blood." Meat Science 68, pp. 507-513. Mar. 23, 2004.
Holthaus, Tony. "Published Headspace Recommendations." 1 page.
International Search Report and Written Opinion, PCT/US06/025879, Mailed on Dec. 18, 2006, Applicant: Cargill, Incorporated, 12 pages.
Jayasingh, P. et al. "46G-17 Sensory evaluation of ground beef stored in high-oxygen modified atmosphere packaging." 2002 Annual Meeting and Food Expo. 1 page.
Jayasingh, P. et al. "Evaluation of Carbon Monoxide (CO) Treatment in Modified Atmosphere (MAP) or Vacuum Packaging (VP) to Increase Color Stability of Fresh Beef" American Meat Science Association. p. 132.

(Continued)

*Primary Examiner* — Keith D Hendricks
*Assistant Examiner* — Jyoti Chawla (57) ABSTRACT

Packaged meat products, methods of packaging meat, and systems for packaging meat. With respect to packaged meat products, one particular embodiment of a packaged meat product comprises a container having a low gas permeability and an enclosed interior volume. The packaged meat product further includes a meat product enclosed within the interior volume of the container and a modified atmosphere comprising not greater than about 10% carbon monoxide within the interior volume of the container. The meat product has a first volume less than the interior volume, and the modified atmosphere has a second volume such that a volume ratio of the second volume to the first volume is not greater than approximately 1:1.

56 Claims, 4 Drawing Sheets

OTHER PUBLICATIONS

Jayasingh, P. et al. "Evaluation of carbon monoxide treatment in modified atmosphere packaging or vacuum packaging to increase color stability of fresh beef." Meat Science. Mar. 9, 2001.

John, L. et al. "76F-20 Comparison of visual color, instrumental color and myoglobin denaturation of cooked ground beef stored in modified atmospheres of 80% oxygen or 0.4% carbon monoxide." 2003 IFT Annual Meeting. 1 page.

John, L. et al. "76F-21 Comparison of color and thiobarbituric acid (TBA) values of cooked beef top sirloin steaks stored in modified atmospheres of 80% oxygen or 0.4% carbon monoxide." 2003 IFT Annual Meeting. 1 page.

John, L. et al. "Comparison of Color and Thiobarbituric Acid Values of Cooked Hamburger Patties after Storage of Fresh Beef Chubs in Modified Atmospheres." Journal of Food Science. vol. 69, Nr. 8, 2004.

John, L. et al. "Color and thiobarbituric acid values of cooked top sirloin steaks packaged in modified atmospheres of 80% oxygen, or 0.4% carbon monoxide, or vacuum." Meat Science. Aug. 27, 2004.

Kader, A.A. "Physiological and Biochemical Effects of Carbon Monoxide Added to Controlled Atmospheres on Fruits." ISHS Acta Horticulturae 138: Postharvest Physiology and Storage, XXI IHC. Abstract only. 1 page, printed on Dec. 28, 2004.

Kahl, L.S. "Agency Response Letter GRAS Notice No. GRN 000005." FDA: Center for Food Safety and Applied Nutrtion. Dec. 11, 1998. 2 pages. <URL: http://www.cfsan.fda.gov/~rdb/opa-g005.html>.

Kaneko, J. "The use of carbon monoxide in fish processing: Commercial concerns." PacMar, Inc. 1 page.

Krogvig, A. et al. "Supplementary information in support of Norwegian application for low percentage usage of CO in Modified Atmosphere Packaging (MAP) system for fresh meat." Norwegian Meat Cooperative and Norwegian Independent Meat Association. Jul. 5, 2002.

Luño, M. et al. "Beef shelf life in low O2 and high CO2 atmospheres containing different low CO concentrations." Meat Science 55, pp. 413-419. 2000.

Luño, M. et al. "Shelf-life Extension and Colour Stabilisation of Beef Packaged in a Low O2 Atmosphere Containing CO: Loin Steaks and Ground Meat." Meat Science, vol. 48, No. 1/2, pp. 75-84. 1998.

Maca, J.V. et al. "Microbiological, Sensory and Chemical Characteristics of Vacuum-Packaged Cooked Beef Top Rounds Treated with Sodium Lactate and Sodium Propionate." Institute of Food Technologists. Abstract only. 1 page, May 1997.

Mace, J.V. et al. "Microbiological, Sensory and Chemical Characteristics of Vacuum-Packaged Ground Beef Patties Treated with Salts of Organic Acids." Institute of Food Technologists. Abstract only. 1 page, May 1997.

Mattia, A. "Agency Response Letter GRAS Notice No. GRN 000166." FDA: Center for Food Safety and Applied Nutrition. Oct. 12, 2005. 2 pages. <URL: http://www.cfsan.fda.gov/~rdb/opa-g166.html>.

Morgan, J. Brad. "Extending Shelf-Life of Beef Cuts Utilizing Low Level Carbon Monoxide in Modified Atmosphere Packaging Systems: Project Summary". Jul. 2003. National Cattlemen's Beef Association Center for Research & Knowledge Management.

Nissen, H. et al. "Comparison between the growth of Yersinia enterocolitica, Listeria monocytogenes, *Escherichia coli* 0 157:H7 and *Salmonella* spp. in ground beef packed by three commercially used packaging techniques." International Journal of Food Microbiology. Jun. 5, 2000.

Nissen, H. et al. "Packaging of Ground Beef in an Atmosphere with Low Carbon Monoxide and High Carbon Dioxide Restrains Growth of *Escherirchia coli* 0157:H7, Listeria Monocytogenes, Yersinia Enterocolitica and *Salmonella* Diarizonae." Edited by Tuijtelaars, A.C.J. et al. *Food Microbiology and Food Safety Into the Next Millenium*. Proceedings of the Seventeenth International Conference of the International Committee on Food Microbiology and Hygiene (ICFMH). pp. 285-286. Sep. 1999.

Oliver, J.F. "Agency Response Letter GRAS Notice No. GRN 000015." FDA: Center for Food Safety and Applied Nutrition. Mar. 10, 2000. 3 pages. <URL: http://www.cfsan.fda.gov/~rdb/opa-g015.html>.

Otwell, W. Steven et al. "L5. Use of Carbon Monoxide For Color Retention in Fish." First Joint Trans-Atlantic Fisheries Technology Conference. 2003.

Rulis, Alan M. "Agency Response Letter GRAS Notice No. GRN 000083." FDA: Center for Food Safety and Applied Nutrition. Feb. 21, 2002. 3 pages. <URL: http://www.cfsan.fda.gov/~rdb/opa-g083.html>.

Scientific Committee on Food, "Opinion of the Scientific Committee on Food on the use of carbon monoxide as component of packaging gases in modified atmosphere packaging for fresh meat." European Commission: Health & Consumer Protection Directorate-General. Dec. 18, 2001.

Solheim, R. "Consumer Purchase Probability of Beef and Pork Packaged in Different Atmospheres." Summary in English, Jul. 1996.

Sørheim, O. et al. "Color stabilization of pork chops packed with a low level of cacbon monoxide." 51st Annual Reciprocal Meat Conference, Jul. 1998, pp. 187-188.

Sørheim, O. "Discoloration of Meat as an Indicator of Leakages in Packages Containing a CO Gas Mixture." Abstract in English, Nov. 24, 1999.

Sørheim, O. "Prospects for Utilization of Carbon Monoxide in the Muscle Food Industry." Edited by W. Steven Otwell et al. *Modified Atmospheric Processing and Packaging of Fish: Filtered Smokes, Carbon Monoxide and Reduced Oxygen Packaging*. pp. 103-115, 2006.

Tarantino, Laura M. "Agency Response Letter GRAS Notice No. GRN 000143." FDA: Center for Food Safety and Applied Nutrition. Jul. 29, 2004. 3 pages. <URL: http://www.cfsan.fda.gov/~rdb/opa-g143.html>.

Tarantino, Laura M. "Agency Response Letter GRAS Notice No. GRN 000167." FDA: Center for Food Safety and Applied Nutrition. Sep. 29, 2005. 3 pages. <URL: http://www.cfsan.fda.gov/~rdb/opa-g167.html>.

Truong, Van-Den. "Lettuce and Tomato." 2 pages. Accessed Dec. 28, 2004.

Yndestad, Magne. "The Use of CO as a Packaging Gas for Fresh Meat." 9 pages, Nov. 4, 2008.

Yoshida, Masaharu et al. "Effect of Carbon Monoxide on Colour Difference and K values in Fresh Fish Muscle." Jpn. J. Food Chem, vol. 5(1), 1998. Abstract only. 1 page.

Clark, D.S. et al., "Use of Carbon Monoxide for Extending Shelf-life of Prepackaged Fresh Beef," Canadian Institute of Food Science and Technology Journal, 1976, pp. 114-117, vol. 9, No. 3.

FDA, "Release-Carbon Monoxide in Fresh Meat," FDA Petition and Press Release, Nov. 15, 2005, 320 pages.

Gill, C.O., "Extending the Storage Life of Raw Chilled Meats," Meat Science, 1996, Supplement pp. 99-109, vol. 43, Elsevier Science.

Hunt, M.C. et al., "Color and Heat Denaturation of Myoglobin Forms in Ground Beef," Journal of Food Science, 1999, vol. 64, No. 5, pp. 847-851.

Jayasingh, P. et al., "Sensory Evaluation of Ground Beef Stored in High-oxygen Modified Atmosphere Packaging," Journal of Food Science, 2002, vol. 67, No. 9, pp. 3493-3496.

Krause, T.R., et, "Use of Carbon Monoxide Packaging for Improving the Shelf Life of Pork," Journal of Food Science, 2003, pp. 2596-2603, vol. 68, No. 8, Institute of Food Technologists.

Sørheim, O., et al., "Carbon Monoxide as a Substitute for Nitrite in Meat Batter Systems," 50th International Congress of Meat Science and Technology, Helsinki, Finland, 4 pages, ICoMST 2004.

Sørheim, O., et al., "Carbon Monoxide in Meat Packaging," Business Briefing Foodtech, Jun. 2002, pp. 1-4.

Sørheim, O., et al., "Effects of Carbon Dioxide on Yield, Texture and Microstructure of Cooked Ground Beef," Meat Science (In Press), 5 pages.

Sørheim, O., et al., "Effects of High $CO_2$/Low CO Atmosphere on Colour and Yield of Cooked Ground Beef Patties," 47th ICoMST, Aug. 26-31, 2001, pp. 196-197, vol. II, Krakow, Poland.

Sørheim, O., et al., "Influence of Beef Carcass Stretching and Chilling Rate on Tenderness of M. Longissimus Dorsi," Meat Science, 2001, pp. 79-85, vol. 57, Elsevier Science.

Sørheim, O., et al., "Muscle Stretching Techniques for Improving Meat Tenderness," Trends in Food Science & Technology, 2002, pp. 127-135, vol. 13, Elsevier Science.

Sørheim, O., et al., "Packaging of Red Meats with Carbon Monoxide Atmospheres," Matforsk-Norwegian Food Research Institute, Jun. 16, 2004, 8 pages, Norway.

Sørheim, O., et al., "Shelf Life of Chicken Fillets with Cheese Sauce Stored in a Low CO/High $CO_2$ Atmosphere," 48th ICoMST—Rome, Aug. 25-30, 2002, pp. 784-785.

Sørheim, O., et al., "Technological, Hygienic and Toxicological Aspects of Carbon Monoxide used in Modified-atmosphere Packaging of Meat," Trends in Food Science & Technology, 1997, pp. 307-312(6), vol. 8, No. 9, Elsevier Science.

Sørheim, O., et al., "The Storage Life of Beef and Pork Packaged in an Atmosphere with Low Carbon Monoxide and High Carbon Dioxide," Meat Science, 1999, pp. 157-164, vol. 52, No. 2, Elsevier Science.

Sørheim, O., et al., "Use of Carbon Monoxide in Retail Meat Packaging," Hot Topics in Meat Processing, Proceedings of the 54th Reciprocal Meat Conference, 2001, p. 47-51, American Meat Science Association.

Tørngren, M.A., et al. "Effect of Packing Method on Colour and Eating Quality of Beef Loin Steaks," 49th International Congress of Meat Science and Technology, 2nd Brazilian Congress of Meat Science and Technology, pp. 495-496, ICoMST 2003.

Watts, D. et al, "Fate of [$^{14}$C] Carbon Monoxide in Cooked or Stored Ground Beef Samples," J. Agric. Food Chem., 1978, pp. 210-214, vol. 26, No. 1.

Zhao, Y. et al., "Dynamic Changes of Headspace Gases in $CO_2$ and $N_2$ Packaged Fresh Beef," Journal of Food Science, 1995, pp. 571-591, vol. 60, No. 3.

* cited by examiner

PACKAGING OF MEAT PRODUCTS WITH MODIFIED ATMOSPHERES AND/OR ENHANCERS

CROSS-REFERENCE TO RELATED APPLICATIONS

The present application claims the benefit of U.S. Provisional Application Nos. 60/578,802 filed on Jun. 10, 2004; 60/579,624 filed Jun. 15, 2004; 60/580,341 filed on Jun. 15, 2004; 60/584,513 filed Jul. 1, 2004; and 60/584,794 filed on Jul. 1, 2004, all of which are incorporated herein by reference in their entirety.

STATEMENT REGARDING RESEARCH DEVELOPMENT AGREEMENT

The subject matter of the present invention is generally directed toward packaged meat products in modified atmospheres and/or with enhancers, and it was made by or on behalf of Cargill Meat Solutions, Inc. and Hormel Foods Corporation under a joint research agreement dated 4 Sep. 2002.

BACKGROUND

Packaged meat products include beef, pork, poultry, mutton, lamb, veal, fish, and other types of meats that are packaged for retail sale to consumers. Many food retailers no longer have in-house butchers that cut and wrap fresh meat products, but rather the fresh meat products are packaged by meat processors in case-ready packages and then shipped to the food retailers. In general, the meat processors strive to package the meat products in a manner that maintains the freshness of the meats for a significant period of time to provide a longer shelf life. Case-ready packages for the meat products, for example, should maintain the color of the meat product, inhibit odors, and retard microbial activity. The packages for the meat products should also enable consumers to view the meat.

One type of package, called "over-wrap" or "tray-wrapped" packages, has a shallow tray (e.g., a Styrofoam tray) and a gas permeable elastomeric film over-wrapped around the shallow tray. Over-wrapped packages accordingly allow oxygen and other gases to transfer into and/or out of the package. Although oxygen initially causes the meat product to be bright red or have another suitable color, over time oxygen degrades the color and flavor of the meat. Over-wrapped packages produced at central case ready facilities, therefore, have a limited shelf life and are not well suited for many retail applications.

Another type of package, called "lid stock" packaging, includes a plastic tray with an upper peripheral edge and an elastomeric film sealed to the upper peripheral edge. The plastic tray and the elastomeric film are often formed of materials having low gas permeabilities to substantially inhibit or even prevent gases from transferring into and/or out of the package. Many lid stock packages also have a modified atmosphere to maintain the color of the meat product and/or retard microbial activity to prolong the shelf life of the packaged meat product. In such Modified-Atmosphere Packages (MAPs), the air is evacuated from the packages within a chamber using a vacuum, and then the evacuated packages are back-flushed with a controlled-composition gas before sealing the elastomeric film to the plastic tray. In high-oxygen MAPs, one approach uses a controlled-gas composition including about 80% oxygen and about 20% carbon dioxide. Low-Oxygen MAPs are another approach that essentially exclude oxygen and instead use about 80-20% carbon dioxide and about 20-80% nitrogen (e.g., about 65% $N_2$ to about 35% $CO_2$). High-oxygen MAPs can significantly extend the shelf life of the packaged meat product compared to over-wrapped packages, but unfortunately the color of the meat still tends to change over time in a manner that renders the meat product less attractive to consumers. For example, ground beef and other red meats may have a suitable red color when they are first packaged in an impermeable MAP, but they gradually develop a less attractive appearance over a number of days (e.g., 10-12 days). Moreover, even if the meat maintains a suitable color, microbial activity can develop a sour odor in the package and eventually render the meat inedible.

One concern with high-oxygen MAPs is that the package itself is relatively large compared to the size of the meat product to provide sufficient headspace for the volume of the controlled-composition gas within the MAP. It is widely understood that a relatively high-volume headspace is necessary in an oxygen-based MAP because the container is impermeable and must contain a sufficient amount of oxygen to maintain an attractive red color on the meat product for a commercially acceptable shelf life. In particular, common wisdom teaches that the volume of the headspace (i.e., gas volume) should be at least as great as the volume of the meat in the container. Common commercial practice teaches that the gas-to-meat volume ratio (gas:meat ratio) should be at least about 1.5:1 with recommended ratios of 2.5:1 to 3.0:1 or even higher. At lower gas:meat ratios, research indicates that the meat will develop an unattractive color in 15 days or less. See C. O. Gill, "Extending the Storage Life of Raw Chilled Meats," *Meat Science*, 43, pp. S99-S108 (1996); Y. Zhao, J. H. Welles, and K. W. McMillin, "Dynamic Changes of Headspace Gases in $CO_2$ and $N_2$ Packaged Fresh Beef," *Journal of Food Science*, 60(3), 571-576 (1995). The entirety of each of these references is incorporated herein by reference. As a result of the large headspace in high-oxygen MAPs, these packages occupy a significant volume in costly refrigeration units in which the packaged meat products are stored, shipped, and displayed. This increases the cost for storing, shipping, and displaying the meat products. The large headspace may also provoke a negative consumer perception of the meat products.

Still another type of packaged meat product includes a plurality of over-wrapped meat packages or other types of gas permeable packages contained in a gas impermeable secondary container flushed with a mixture of gases (e.g., oxygen, carbon monoxide, carbon dioxide, and/or nitrogen). Although the secondary container is impermeable and has a modified atmosphere, each of the individual packages containing the meat products is permeable to gases. Retailers are advised to remove the individual packages from the secondary container within a stated distribution period, and then display the individual packages for retail sale for a defined retail period of time after the individual packages have been removed from the secondary container. The shelf life of the individual packages is limited after they have been removed from the secondary container because the individual packages are permeable to oxygen. Therefore, this packaging suffers from concerns similar to those of over-wrapped packaging.

Still another type of packaging provides a plastic tray and a two-ply cover having a gas permeable film attached to the upper rim of the tray and a gas impermeable film attached to the gas permeable film. The container holds a meat product and has a modified atmosphere while the gas impermeable film is attached to the gas permeable film. At the retailer, the retailer removes the gas impermeable film from the gas permeable film, allowing oxygen and other gases to pass into and out of the container while it is displayed for sale. This container accordingly has a limited shelf life as well.

Still another container design is a low-oxygen container in which the meat product is packaged in an atmosphere having less than 0.5% carbon monoxide (CO) and the balance a mixture of carbon dioxide ($CO_2$) and/or nitrogen ($N_2$). In particular, research in Norway indicates that suitable levels of carbon monoxide in such modified atmospheres are from 0.1-0.5%. A common gas composition for packaging red meats in these containers contains approximately 0.4% CO and a mixture of $CO_2$ and $N_2$ for the balance. The gas:meat volume ratio of these packages, however, is believed to have been approximately the same as that of the high-oxygen packages described above (e.g., at least as great as the volume of the meat in the container, or more in line with commercial practices of gas:meat volume ratios of at least about 1.5:1 and more commonly 2.5-3:1 or higher). Therefore, the total volume of these packages also inefficiently uses the available space for storing, shipping, and displaying the packaged meat products.

DETAILED DESCRIPTION

A. Overview

Various embodiments of the present invention provide packaged meat products, methods of packaging meat, and systems for packaging meat. With respect to packaged meat products, one particular embodiment of a packaged meat product comprises a container having a low gas permeability and an enclosed interior volume. The packaged meat product further includes a meat product enclosed within the interior volume of the container and a modified atmosphere comprising not greater than about 10% carbon monoxide within the interior volume of the container. The meat product has a first volume less than the interior volume, and the modified atmosphere has a second volume such that a volume ratio of the second volume to the first volume is not greater than approximately 1:1. In a more specific aspect of this embodiment, the container comprises a first portion having a generally fixed volume and a gas permeability to oxygen of not greater than about 20 $cc/m^2/24$ hours, and a second portion sealed to the first portion. The second portion of the container also has a permeability not greater than about 20 $cc/m^2/24$ hours and is generally transparent. Several additional specific aspects of this embodiment have a modified atmosphere comprising between about 0.1% CO to about 30% CO, and more particularly comprising about 0.3% CO to about 1.2% CO, and in several applications between about 0.4% CO to about 0.5% CO. In still further particular aspects of this embodiment, the gas:meat volume ratio is from approximately 0.1:1 to about 0.9:1, and in more particular embodiments the gas:meat volume ratio is from approximately 0.3:1 to about 0.8:1. In still further particular embodiments, the meat product includes a meat portion that has been treated with an enhancer comprising at least one of a lactate and a diacetate.

Another embodiment of a packaged meat product in accordance with the invention comprises a container having a base portion and a cover sealed to the base portion to form an enclosure. The base portion has a generally fixed shape defining a container volume, and the cover is generally transparent. Both the base portion and the cover portion have low gas permeabilities, such as a permeability to oxygen of not greater than 20 $cc/m^2/24$ hours. The packaged meat product further includes a meat product carried by the base portion in the enclosure and a modified atmosphere containing not more than about 10% carbon monoxide within the enclosure. The meat product occupies a product volume in the enclosure, and the modified atmosphere occupies an atmospheric volume in the enclosure such that a volume ratio of the atmospheric volume to the product volume is not more than about 1:1.

Another embodiment of the invention is directed toward a packaged meat product assembly comprising a shipping container and a plurality of individually packaged meat products in the shipping container. The individually packaged meat products each comprise a container having a base portion with a low gas permeability and a cover with a low gas permeability sealed to the base portion to define an enclosure. The individually packaged meat products further include a meat product in the enclosure of the container, a modified atmosphere in the enclosure of the container, and a shelf life indicator imparted to the container (e.g., a label attached to the container or indicia indelibly printed or stamped on the container). The modified atmosphere comprises not more than about 10% carbon monoxide, and the indicator can be a date when the meat product is expected to expire. The shelf life indicators are imparted to the individual packages before loading the individual packages into the shipping container. As such, meat processors can more closely control the expiration date associated with the individual packaged meat products.

Additional embodiments of the invention are directed toward methods of packaging a meat product. One embodiment of a method of packaging a meat product comprises positioning a meat product having a first volume in a base portion of a container having a low gas permeability, and providing a controlled-gas composition in the base portion of the container. This method further includes attaching a cover having a low gas permeability to the base portion to enclose the meat product and the controlled-gas composition in an enclosure having interior volume. The modified atmosphere in the enclosure has not more than about 10% carbon monoxide and a second volume such that a volume ratio of the second volume to the first volume is not greater than about 1:1.

Another aspect of the invention is a method of packaging a meat product at a packaging location. One embodiment of such a method comprises forming a meat product to have a first volume and positioning the meat product in a first portion of a container. The first portion of the container has a low gas permeability. This method continues by providing a controlled-gas composition in the first portion of the container and sealing a second portion of the container to the first portion of the container to form an enclosure containing the meat product and a modified atmosphere including the controlled-gas composition. The second portion of the container has a low gas permeability as well, and the modified atmosphere has not greater than about 10% carbon monoxide. This method further includes imparting to the container an indicator of when a shelf life of the meat product is expected to expire before shipping the packaged meat product to a retailer. For example, a label with an expiration date can be attached to the container before shipping the packaged meat product to a meat product retailer.

As used herein, the term "meat" is intended to refer to "red meat," "white meat," and other meat-like products of animal origin. For example, "meat" is explicitly intended to include beef, pork, mutton, lamb, veal, poultry, and fish. Where the context permits, singular or plural terms may also include the plural or singular term, respectively. Additionally, unless the word "or" is expressly limited to mean only a single item exclusive from other items in reference to a list of two or more items, then the use of "or" in such a list is to be interpreted as including (a) any single item in the list, (b) all of the items in the list, or (c) any combination of items in the list. The term "comprising" is used herein to mean including at least the recited feature(s) such that any greater number of the same feature and/or types of other features or other components are not precluded. Moreover, various embodiments of the invention are described in this section to provide specific details for a thorough understanding and enabling description of these embodiments. A person skilled in the art, however, will understand that the invention may be practiced without several of these details, or that additional details can be added to the invention.

B. Selected Embodiments of Packaged Meat Products

Figure 1:
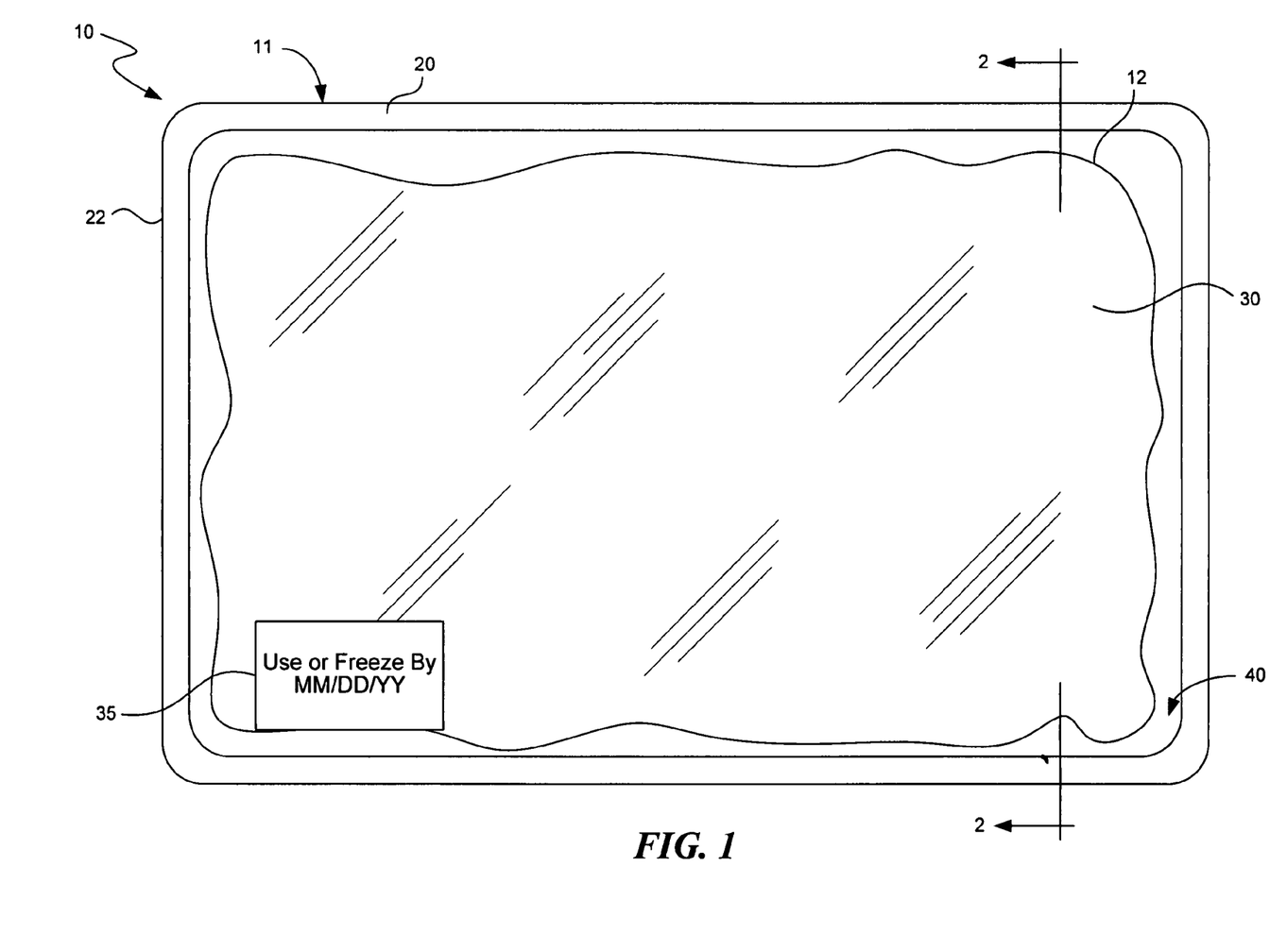
FIG. 1 is a top plan view of a packaged meat product in accordance with an embodiment of the invention.
Figure 2:
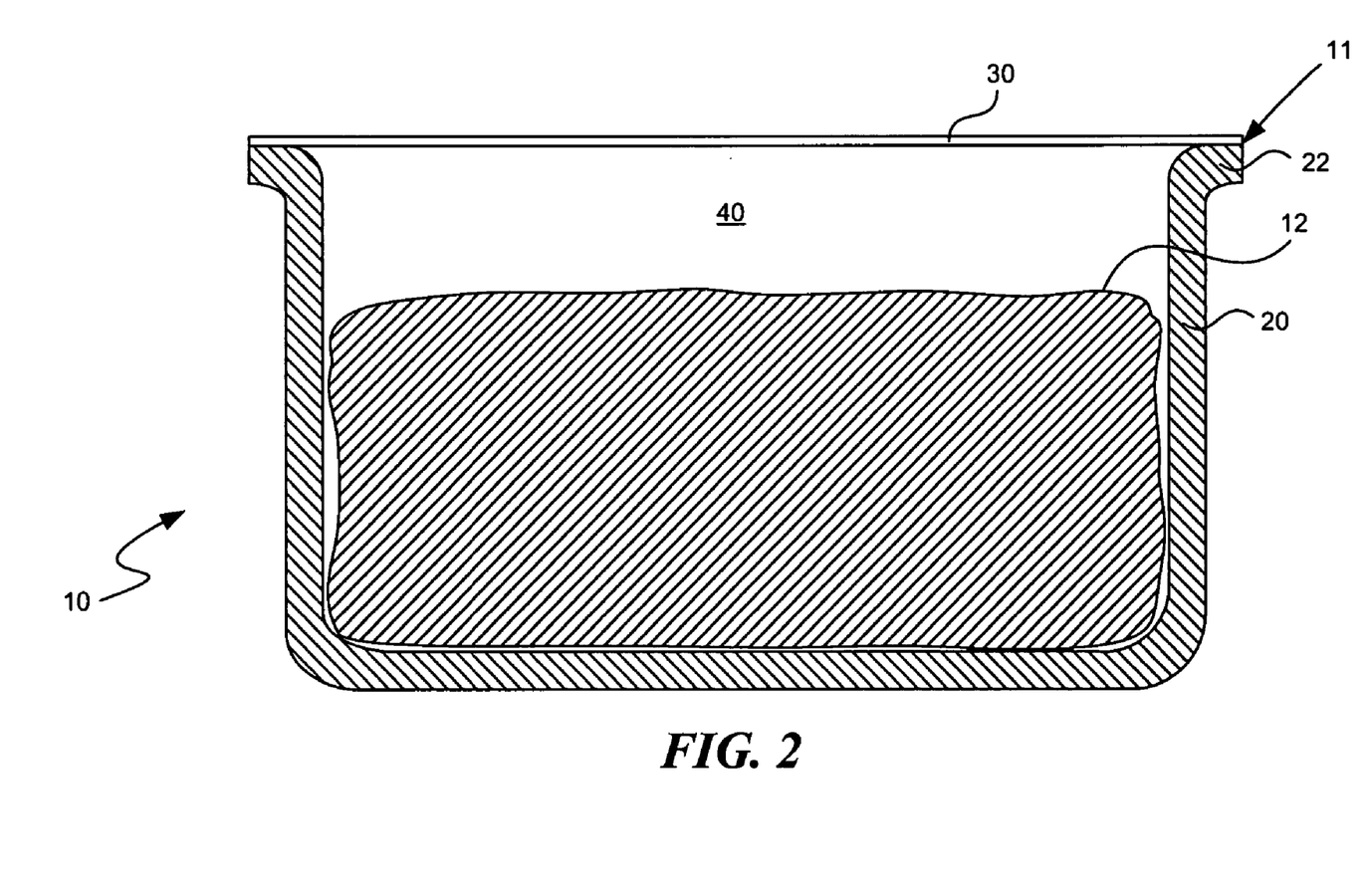
FIG. 2 is a cross-sectional view of the packaged meat product of FIG. 1.

FIGS. 1 and 2 schematically illustrate a packaged meat product 10 in accordance with one embodiment of the invention. In this embodiment, the packaged meat product 10 is typified as a lid stock package having a container 11 including a first portion and a second portion attached to the first portion. For example, the first portion can be a base portion such as a bottom tray 20, and the second portion can be a barrier such as a sealing film 30. The tray 20 may be formed of food grade plastic, e.g., a molded polyester, polystyrene, or polypropylene. In one implementation, the tray 20 is relatively thick, e.g., 10-50 mils, and rigid enough to serve as a structural member to define a generally fixed volume of the final package. Lid stock packages with such trays are used commercially to package whole muscle cuts of beef, for example, for retail sale. In another embodiment, the first portion of the container comprises a flexible plastic film. As is known in the art of packaging processed meats, e.g., sliced lunchmeats, the first portion of the container may comprise a flexible pocket formed in a web of moving film. Although a variety of plastics may be used for such a flexible first portion, relatively low permeability materials (e.g., a metallized plastic) are preferred. In one select implementation, the tray 20 has a low gas permeability, particularly permeability to oxygen and to $O_2$ or CO, that is lower than the permeability of the sealing film 30 and/or less than about 100 cc/m$^2$/24 hr., or more preferably less than about 20 cc/m$^2$/24 hr. In some instances, the permeability of the tray 20 and sealing film 30 is less than about 1.5 cc/m$^2$/24 hr.

Suitable sealing films 30 are desirably low-permeability, food-grade plastic films (e.g., CVP or polypropylene) that may be sealed to the upper periphery of the tray 20 (e.g., by heat sealing). The typical thickness for such a sealing film is on the order of 3 mils or less. A wide variety of such films are commercially available for use in food packaging applications. The sealing film 30 may be formed of a single homogenous ply or a series of different plies, but the sealing film 30 desirably has a unitary construction (i.e., it cannot be separated into distinct thicknesses or plies in ordinary use). For example, the sealing film 30 may comprise a series of plies formed of different materials that are laminated together into a unitary structure. Such unitary sealing films 30 are distinguishable from multiple-ply films that are specifically designed to be separated into different plies during their normal use.

The sealing film 30 is desirably bonded directly to the tray 20. In one useful implementation, the tray 20 includes a peripheral flange 22 to which the sealing film 30 is bonded by a heat sealing process or another suitable process. In this embodiment, the low gas permeable sealing film 30 is juxtaposed with a meat product 12 in the package interior without any intervening film or other non-gaseous material interposed between the film 30 and the meat product 12.

As shown in FIG. 1, the sealing film 30 is at least partially translucent to permit the consumer to view the meat product 12 in the packaged meat product 10. The sealing film 30 is preferably substantially transparent and substantially colorless, or at least has a substantially transparent and colorless window, so that consumers can visually assess the quality and/or status of the meat product 12. If the sealing film 30 is colored or otherwise visually interferes with such visual assessment, it is anticipated that such a film would meet substantial consumer resistance.

The packaged meat product 10 also includes a visible indicium or visible indicia that notify the end user of a date associated with the meat product 12. In one embodiment, the sealing film 30 includes a date field 35 that is prominently displayed to the consumer at the retail point of sale. The date field 35 may be indelibly printed or stamped directly onto the sealing film by the meat packager; this would substantially limit the chances that retailers could inadvertently or intentionally alter the date information in the date field 35. In one embodiment, the date field 35 informs the consumer the date by which the packaged meat product should be purchased (e.g., a "sell by" date). In the illustrated embodiment, the date field 35 identifies the date by which the product should be consumed or frozen to avoid spoilage, such as by stating "Use or Freeze By: MM/DD/YY," wherein "MM" refers to the month, "DD" refers to the day of the month, and "YY" refers to the year.

The use of modified atmosphere packages in accordance with select embodiments of the invention may significantly improve color and/or odor characteristics of the meat product 12 over the course of its shelf life. This enhances consumer appeal over the course of an acceptable shelf life, but some regulatory agencies have expressed concern regarding techniques that can suppress indicators on which consumers ordinarily rely to evaluate meat spoilage. The date field 35 can accordingly add a further safeguard by informing consumers of the date by which a product should be used or frozen. This is particularly advantageous where the sealing film 30 has a unitary construction rather than a peelable construction that could permit a retailer to change the date presented to the consumers. In contrast, many conventional approaches for meat employ a gas permeable film that defines the effective sell-by date. The retailer typically puts a sell-by or use-by date on the package that is a set number of days after the package has been removed from a bag or other modified atmosphere for retail display. The consumer, however, has no idea of the actual age of the meat and the retailer may not use the same shelf life standards recommended by the meat packager.

As noted above, the interior volume of the sealed packaged meat product 10 is greater than the volume of the meat product 12. This leaves a volume of gas in a "headspace" within the container. Conventional packaging techniques for impermeably sealed packages (e.g., lid stock packages) dictate that the volume of the headspace should be greater than the meat volume; commercial practice dictates gas:meat ratios of at least about 1.5:1 (e.g., about 2.5:1 to 3:1). At a gas:meat ratio of 1.5:1, the volume of the package must be at least 2.5 times the meat volume. At a ratio of 3:1, the package volume must be at least 4 times the meat volume such that less than 25% of the volume of a shipping container is actually occupied by the meat itself. This can materially increase shipping and storage costs because a significant portion of the storage space and shipping volume are occupied by gas instead of a meat product. This also requires the retailer to restock retail displays more often.

In accordance with several embodiments of the invention, the gas space in the sealed package is less than the volume of the meat. In one exemplary embodiment, the gas:meat volume ratio is no greater than about 0.8:1 (e.g., 0.75:1 or less). At such ratios, the interior volume of the sealed enclosure can be less than twice the meat volume, such as no greater than about 1.8 times the meat volume and more preferably 1.75 times the meat volume. Even when allowing for space between adjacent packages, the space in a storage area or shipping container occupied by meat instead of headspace may approach or even exceed 50%. Additional embodiments of the invention have a gas:meat volume ratio of not greater than 0.3:1, 0.4:1, 0.5:1, 0.6:1, or 0.7:1. In general, the gas:meat volume ratio is desirably reduced to reduce the total volume of the container, but in many embodiments the gas:meat volume ratio should be high enough so that the sealing film does not contact the meat product.

The gas in a gas space 40 is desirably substantially non-oxidizing modified atmosphere that includes no greater than 30% CO (on a volume basis), and desirably no greater than 10% CO. Several embodiments have a non-oxidizing gas with 1.2% CO or less. In one embodiment, the CO content of the gas in the gas space 40 is no higher than 0.5%, e.g., 0.48%. In one commercially useful implementation, the gas includes no more than about 0.4% CO, e.g., 0.1-0.3% CO. The balance of the gas in the gas space 40 can be any desired non-oxidizing gas that is deemed safe for use in such food applications. One suitable gas includes no more than about 0.4% CO, about 0-80% $N_2$, and about 19.6-99.6% $CO_2$. A gas containing about 0.2-0.4% CO, about 35% $CO_2$, and a balance of nitrogen is also expected to work well. It has been found that this approach yields a compact packaged meat product that permits a greater utilization of shipping, storage, and display space, yet maintains acceptable product color for 25 days or more. This can be quite advantageous commercially.

In other embodiments, different atmospheres having residual oxygen of less than 1%, and more desirably less than 0.2% or even 0%, can be used. In one test, for example, four samples of a top round steak were packaged in four #3-1.66" lid stock packages having a gas:meat ratio of about 0.7:1 and an atmosphere of 35% $CO_2$, 64.6% $N_2$ and 0.4% CO. The first sample was a control sample with this atmosphere, the atmosphere of the second sample was altered to contain 0.22% $O_2$, the atmosphere of the third sample was altered to contain 0.75% $O_2$, and the atmosphere of the fourth sample was altered to contain 1.05% $O_2$. After 27 days, the four samples were evaluated on a subjective 8-point color or acceptability scale as follows: 8 (extremely acceptable/desirable—bright cherry red), 7 (very acceptable/desirable—pinkish red/red), 6 (moderately acceptable/desirable—pink/pinkish red), 5 (slightly acceptable/desirable—pale pink/pink/dull), 4 (slightly unacceptable/undesirable—brownish pink/pale pink), down to 1 (extremely unacceptable/undesirable—brown). After 27 days, the first sample with no $O_2$ scored 7, the second sample with 0.22% $O_2$ scored 5.5, the third sample with 0.75% $O_2$ scored 4.5, and the fourth sample with 1.05% $O_2$ scored 4.5. As such, this test shows that a low residual oxygen level is desirable with a low gas:meat ratio of about 0.7:1.

Testing was also conducted to determine the effect of the gas:meat volume ratio using a low-oxygen modified atmosphere in a low gas impermeable package. This test analyzed the color for several beef cuts and different gas:meat volume ratios based on the subjective 8-point scale set forth above for visual color scores with 8 being the best color and a score of 7 or 8 being considered optimal. Using a calorimeter, this test also objectively measured indications of color, including the lightness (L* with 0 being black to 100 being white), a green-to-red measurement (a* with −30 being green to +30 being red), and a blue-to-yellow measurement (b* with −30 being blue to +30 being yellow). This test also subjectively scored the odor of the beef cuts on a 5-point scale with a score of 1 indicating no odor and a score of 5 indicating extreme odor (e.g., spoilage).

The procedures for the gas:meat volume test included obtaining several samples of various cuts of beef, including chuck roast, London broil, chuck tender, strip steak, and top round roast. The samples were weighed and placed in suitable trays having package sizes of #3-1.41", #3-1.91", #9-1.25" and #10-3". The packages were subsequently processed by (a) removing the oxygen from the packages using a vacuum, (b) back-flushing the packages with a controlled-composition gas having about 0.4% CO, about 64.6% $N_2$, and about 35% $CO_2$, and (c) sealing the packages with a barrier film such that the packages had a low-oxygen modified atmosphere of the controlled-composition gas. The trays and barrier film each had a low gas permeability. The packages were then stored at about 2° C., and color and odor measurements were obtained over a period of 7-25 days from packaging.

Table 1 sets forth the color and odor scores for chuck roast, London broil, chuck tender, strip steak, and top round roast beef cuts packaged in different package sizes that have gas:meat volume ratios from approximately 0.3:1 to 1.5:1. As shown in Table 1, the odor and color scores of the different beef cuts are very good for gas:meat volume ratios from 0.3:1 to about 0.8:1; the color and odor scores for MAPs with such low gas:meat volume ratios compare favorably to conventional MAPs with gas:meat volume ratios of about 1.5:1. In contrast to conventional wisdom and commercial practices, a low-oxygen modified atmosphere in combination with a gas:meat volume ratio not more than 1:1, and desirably less than about 0.8:1, provides good color over a long shelf life. Suitable gas:meat volume ratios can be approximately 0.3:1 to 0.4:1 at the low end, approximately 0.5:1 to 0.8:1 in a mid-range, or even approximately 1.3:1 to 1.5:1 at the high end. Of course, to provide a smaller package, the gas:meat volume ratios of many embodiments of the invention are from the low end to the mid-range.

TABLE 1

Experimental Examples of Color and Odor Scores for
Gas:Meat Ratios After 7–25 Days for Various Cuts

| Meat Product | Package Size (Footprint Form-Depth) | Odor (1–5) | Color (1–8) | $CO_2$ % | Gas:Meat Volume Ratio | $L^*$ | $a^*$ | $b^*$ |
|---|---|---|---|---|---|---|---|---|
| Chuck Roast | 10-3" | 1 | 8 | 21.7 | 0.331 | 35.45 | 34.04 | 13.9 |
| Chuck Roast | 10-3" | 1 | 8 | 21.0 | 0.342 | 35.25 | 32.52 | 13.19 |
| London Broil | 3-1.91" | 1 | 7 | 25.3 | 0.344 | 40.6 | 31.05 | 12.86 |
| Chuck Roast | 10-3" | 1 | 8 | 20.5 | 0.350 | 42.4 | 34.52 | 13.53 |
| London Broil | 3-1.91" | 1 | 7 | 23.1 | 0.352 | 42.75 | 27.03 | 10.47 |
| Chuck Roast | 10-3" | 1 | 8 | 21.1 | 0.361 | 41.13 | 28.85 | 10.8 |
| Chuck Tender | 9-1.25" | 2 | 8 | 23.1 | 0.378 | 37.25 | 30.79 | 10.62 |
| Chuck Tender | 9-1.25" | 1 | 8 | 22.4 | 0.378 | 40.15 | 30.14 | 10.31 |
| Strip Steak | 3-1.41 | 1 | 8 | 22.4 | 0.388 | 42.79 | 29.68 | 9.22 |
| Chuck Tender | 9-1.25" | 1 | 8 | 23.5 | 0.399 | 33.91 | 27.81 | 9.98 |
| Chuck Tender | 9-1.25" | 1 | 8 | 24.1 | 0.599 | 35.89 | 29.56 | 11.65 |
| Chuck Tender | 9-1.25" | 1 | 8 | 24.7 | 0.599 | 37.88 | 33.45 | 12.96 |
| Chuck Roast | 10-3" | 2 | 8 | 23.5 | 0.601 | 38.46 | 28.25 | 10.09 |
| Chuck Tender | 9-1.25" | 2 | 8 | 24.4 | 0.610 | 35.57 | 28.99 | 10.61 |
| Chuck Tender | 9-1.25" | 1 | 8 | 23.0 | 0.613 | 37.68 | 29.72 | 10.85 |
| Chuck Tender | 9-1.25" | 1 | 8 | 24.9 | 0.613 | 36.03 | 27.57 | 9.83 |
| London Broil | 3-1.91" | 1 | 8 | 24.3 | 0.707 | 39.65 | 28.24 | 12.22 |
| Strip Steak | 3-1.41" | 1 | 7 | 23.0 | 0.712 | 37.81 | 28.57 | 10.56 |
| Chuck Tender | 9-1.25" | 1 | 8 | 26.3 | 0.725 | 38.33 | 29.52 | 9.92 |
| Strip Steak | 3.141" | 1 | 8 | 22.8 | 0.729 | 41.82 | 29.34 | 10.32 |
| Top Round Roast | 10-3" | 2 | 7 | 27.7 | 0.735 | 43.2 | 31.5 | 12.69 |
| London Broil | 3-1.91" | 1 | 7 | 26.2 | 0.751 | 37.09 | 31.41 | 13.45 |
| Chuck Tender | 9-1.25" | 1 | 7 | 24.4 | 0.755 | 35.11 | 29.45 | 9.96 |
| London Broil | 3-1.91" | 2 | 7 | 23.9 | 0.761 | 41.92 | 26.9 | 9.91 |
| Chuck Roast | 10-3" | 1 | 7 | 26.0 | 0.762 | 45.78 | 29.8 | 12.16 |
| London Broil | 3-1.91" | 1 | 8 | 24.5 | 0.781 | 42.6 | 28.04 | 11.73 |
| Chuck Roast | 10-3" | 1 | 7 | 25.9 | 0.804 | 38.41 | 31.71 | 12.33 |
| Top Round Roast | 10-3" | 2 | 8 | 31.6 | 1.320 | 37.96 | 29.07 | 9.38 |
| Top Round Roast | 10-3" | 1 | 8 | 29.2 | 1.358 | 42.72 | 32.17 | 11.94 |
| Top Round Roast | 10-3" | 1 | 7 | 30.7 | 1.388 | 36.07 | 28.15 | 10.4 |
| Top Round Roast | 10-3" | 1 | 8 | 31.0 | 1.444 | 38.63 | 30.02 | 10.73 |
| Top Round Roast | 10-3" | 1 | 8 | 31.7 | 1.548 | 40.18 | 30.42 | 10.53 |

In further embodiments of the invention, the meat product is treated with an enhancer, such as a solution that includes at least one of ascorbic acid, a lactate, and a diacetate, to further improve the odor and microbial state of the meat product. Using such a treatment in combination with a low-oxygen modified atmosphere and gas:meat ratio such as those outlined above has a surprising synergistic effect that improves the shelf life of the meat. In a test in which meat was packaged in a sealed lid stock container in which the headspace was filled with a non-oxidizing gas containing up to 0.4% CO, some of the meat was "enhanced" by adding about 12 weight percent (wt. %) of a brine solution that included both a lactate and a diacetate, namely beef broth, NaCl, sodium phosphate, potassium lactate, and sodium diacetate. The results of this study suggest that the color of both types of meat remained acceptable for 28 days. The enhanced meat product, however, consistently exhibited lower microbial levels throughout the course of the test.

One such test to determine the effect of treating the meat product with an enhancer studied the effect of a lactate enhancer in a low-oxygen atmosphere containing carbon monoxide. Six beef strip loins were obtained, and the loins were cut into one inch steaks. The steak samples from each loin were tagged and were randomly allocated to each of the following four treatments: Treatment 1 was a non-enhanced meat packaged with 30% carbon dioxide and 70% nitrogen; Treatment 2 was a non-enhanced meat packaged with 35% carbon dioxide, 64.6% nitrogen, and 0.40% carbon monoxide; Treatment 3 was a meat enhanced with water, phosphate, salt, and natural flavoring packaged with 35% carbon dioxide, 64.6% nitrogen, and 0.40% carbon monoxide; and Treatment 4 was a meat enhanced with water, potassium lactate, phosphate, salt, and natural flavoring packaged with 35% carbon dioxide, 64.6% nitrogen, and 0.40% carbon monoxide. The amount of potassium lactate was approximately 1.50% of the weight of the enhanced meat, but in other embodiments the potassium lactate acid can be up to 4.80% of the weight of the meat product may be used.

The meat products were enhanced by injecting the samples with a brine using a Schroder Lab injector with 12% retention of the solution in the meat. All of the samples were individually placed in #3 barrier plastic trays and packaged on a Ross Jr. INPACK lid stock machine. The packages were back-flushed according to the respective gas treatment. Residual oxygen levels in the trays were less than 500 ppm. The packaged products were boxed and placed in a cooler at −2° C. for 48 hours and were then stored in a cooler at 2° C. to 3° C. One sample from each beef strip loin from each treatment was evaluated at 26, 30, and 41 days for color, odor, gas content, microbial content, and chemical content. Odor was determined based on odor scores of 1 indicating no odor, 2 indicating a slight odor, 3 indicating a moderate odor, and 4 indicating a strong odor. The results are shown below in Tables 2-5. Based on the odor scores, Treatment 4 with a lactate enhancer and an atmosphere including carbon monoxide performed better than the other treatments over time.

TABLE 2

Effect of Treatments on Meat Attributes After 26 Days

| Treatment Sample | Count/gm TPC (log 10) | Count/gm PSY (log 10) | % PRO | % STPP | pH | TBA | % Salt | % K Lactate | Odor Score |
|---|---|---|---|---|---|---|---|---|---|
| 1-1 | 3.15 | 6.30 | 19.65 | 0.00 | 5.50 | 3.35 | 0.10 | 1.16 | 3 |
| 1-2 | 3.60 | 5.67 | 20.80 | 0.00 | 5.52 | 1.98 | 0.08 | 1.28 | 2 |
| 1-3 | 2.93 | 5.49 | 20.90 | 0.00 | 5.47 | 2.15 | 0.06 | 1.23 | 1.5 |
| 1-4 | 3.04 | 5.63 | 21.33 | 0.00 | 5.53 | 1.56 | 0.07 | 1.16 | 2.5 |
| 1-5 | 2.81 | 5.54 | 19.50 | 0.00 | 5.47 | 1.91 | 0.05 | 1.08 | 2 |
| 1-6 | 3.54 | 5.52 | 20.95 | 0.00 | 5.42 | 2.62 | 0.06 | 1.27 | 2 |
| Average | 3.18 | 5.69 | 20.52 | 0.00 | 5.49 | 2.26 | 0.07 | 1.20 | 2.17 |
| 2-1 | 4.00 | 5.60 | 20.10 | 0.00 | 5.51 | 3.32 | 0.07 | 1.15 | 2 |
| 2-2 | 2.94 | 5.46 | 20.64 | 0.00 | 5.54 | 3.04 | 0.12 | 1.25 | 1 |
| 2-3 | 1.78 | 5.71 | 20.13 | 0.00 | 5.47 | 2.71 | 0.04 | 1.23 | 1 |
| 2-4 | 1.78 | 5.71 | 22.04 | 0.00 | 5.47 | 1.86 | 0.05 | 1.20 | 1 |
| 2-5 | 2.98 | 5.72 | 21.72 | 0.00 | 5.43 | 1.85 | 0.11 | 1.25 | 1 |
| 2-6 | 3.59 | 5.79 | 21.07 | 0.00 | 5.39 | 2.25 | 0.06 | 1.29 | 2.5 |
| Average | 2.85 | 5.67 | 20.95 | 0.00 | 5.47 | 2.51 | 0.08 | 1.23 | 1.42 |
| 3-1 | 3.15 | 5.79 | 17.70 | 0.05 | 5.68 | 1.01 | 0.28 | 1.00 | 1 |
| 3-2 | 2.52 | 5.86 | 18.72 | 0.01 | 5.67 | 0.76 | 0.25 | 1.04 | 1 |
| 3-3 | 3.00 | 5.96 | 19.13 | 0.10 | 5.63 | 0.40 | 0.37 | 1.10 | 1.5 |
| 3-4 | 2.15 | 5.72 | 20.07 | 0.03 | 5.55 | 0.69 | 0.33 | 1.16 | 2 |
| 3-5 | 2.62 | 5.78 | 19.02 | 0.01 | 5.55 | 0.55 | 0.28 | 1.07 | 2 |
| 3-6 | 3.11 | 5.78 | 20.06 | 0.03 | 5.58 | 0.33 | 1.19 | 2.5 | |
| Average | 2.76 | 5.81 | 19.12 | 0.04 | 5.60 | 0.67 | 0.31 | 1.09 | 1.67 |
| 4-1 | 2.97 | 5.83 | 18.93 | 0.02 | 5.79 | 0.46 | 0.34 | 2.03 | 1 |
| 4-2 | 2.97 | 5.59 | 19.83 | 0.02 | 5.78 | 0.64 | 0.30 | 2.03 | 1 |
| 4-3 | 3.15 | 4.95 | 18.85 | 0.08 | 5.79 | 0.20 | 0.33 | 2.24 | 1 |
| 4-4 | 3.11 | 5.62 | 19.66 | 0.03 | 5.73 | 0.30 | 0.33 | 2.12 | 1 |
| 4-5 | 2.57 | 5.91 | 19.99 | 0.07 | 5.78 | 0.59 | 0.34 | 2.33 | 1 |
| 4-6 | 3.65 | 5.83 | 18.25 | 0.03 | 5.73 | 0.47 | 0.33 | 2.11 | 1.5 |
| Average | 3.07 | 5.62 | 19.25 | 0.04 | 5.77 | 0.44 | 0.33 | 2.14 | 1.10 |

TABLE 3

Effect of Treatments on Meat Attributes After 30 Days

| Treatment Sample | Count/gm TPC (log 10) | Count/gm PSY (log 10) | pH | TBA | % Salt | % K Lactate | Odor Score |
|---|---|---|---|---|---|---|---|
| 1-1 | 1.30 | 5.36 | 5.47 | 2.39 | 0.11 | 1.29 | 2.5 |
| 1-2 | 1.00 | 4.85 | 5.51 | 2.30 | 0.07 | 1.35 | 2.5 |
| 1-3 | <1.00 | 5.32 | 5.41 | 2.45 | 0.05 | 1.29 | 2 |
| 1-4 | 1.00 | 4.72 | 5.42 | 2.67 | 0.05 | 1.35 | 2 |
| 1-5 | 1.00 | 4.54 | 5.44 | 2.39 | 0.05 | 1.14 | 2 |
| 1-6 | 2.72 | 5.52 | 5.38 | 1.41 | 0.06 | 1.24 | 3 |
| Average | 1.34 | 5.05 | 5.44 | 2.27 | 0.07 | 1.28 | 2.33 |
| 2-1 | 3.54 | 5.46 | 5.53 | 2.82 | 0.06 | 1.30 | 1.5 |
| 2-2 | 2.23 | 5.80 | 5.52 | 3.56 | 0.06 | 1.29 | 1.5 |
| 2-3 | 2.30 | 5.59 | 5.42 | 3.14 | 0.04 | 1.17 | 1.5 |
| 2-4 | 2.71 | 5.58 | 5.45 | 2.24 | 0.05 | 1.27 | 1 |
| 2-5 | 1.85 | 5.36 | 5.41 | 2.87 | 0.04 | 1.25 | 1.5 |
| 2-6 | 3.28 | 5.46 | 5.37 | 2.30 | 0.06 | 1.17 | 2 |
| Average | 2.65 | 5.54 | 5.45 | 2.82 | 0.05 | 1.24 | 1.5 |
| 3-1 | 3.41 | 5.51 | 5.61 | 0.94 | 0.29 | 1.20 | 1.5 |
| 3-2 | 3.11 | 6.20 | 5.60 | 1.05 | 0.22 | 1.18 | 2 |
| 3-3 | 2.30 | 4.82 | 5.60 | 0.41 | 0.31 | 1.11 | 1.5 |
| 3-4 | 2.83 | 4.96 | 5.56 | 0.30 | 0.31 | 1.23 | 2 |
| 3-5 | 1.70 | 5.48 | 5.50 | 0.44 | 0.25 | 2.10 | 2 |
| 3-6 | 3.83 | 5.59 | 5.57 | 0.30 | 0.39 | 1.82 | 1.5 (Puffy) |
| Average | 2.86 | 5.43 | 5.57 | 0.57 | 0.30 | 1.44 | 1.75 |
| 4-1 | 3.57 | 5.23 | 5.80 | 1.29 | 0.31 | 2.10 | 1 |
| 4-2 | 2.43 | 5.36 | 5.72 | 1.38 | 0.25 | 2.50 | 1 |
| 4-3 | 3.90 | 5.83 | 5.75 | 0.77 | 0.28 | 1.91 | 1 |
| 4-4 | 2.08 | 5.52 | 5.7 | 1.01 | 0.36 | 2.08 | 1 |
| 4-5 | 1.60 | 5.28 | 5.65 | 1.15 | 0.25 | 1.77 | 1 |
| 4-6 | 2.75 | 5.99 | 5.66 | 0.56 | 0.29 | 1.92 | 2 |
| Average | 2.72 | 5.53 | 5.71 | 1.03 | 0.29 | 2.05 | 1.17 |

TABLE 4

Effect of Treatments on Meat Attributes After 41 Days

| Treatment Sample | Count/gm TPC (log 10) | Count/gm PSY (log 10) | pH | TBA | % Salt | % K Lactate | Odor Score |
|---|---|---|---|---|---|---|---|
| 1-1 | <1.00 | 5.89 | 5.47 | 3.16 | 0.10 | 1.30 | 2.5 |
| 1-2 | 2.65 | 5.71 | 5.52 | 2.32 | 0.09 | 1.21 | 2 |
| 1-3 | 3.84 | 4.94 | 5.47 | 2.99 | 0.06 | 1.36 | 2.5 |
| 1-4 | <1.00 | 5.66 | 5.42 | 2.68 | 0.07 | 1.37 | 2 |
| 1-5 | 1.48 | 5.99 | 5.38 | 2.42 | 0.07 | 1.20 | 2 |
| 1-6 | 2.80 | 6.15 | 5.38 | 1.83 | 0.06 | 1.45 | 3 (Puffy) |
| Average | 2.13 | 5.72 | 5.44 | 2.57 | 0.08 | 1.32 | 2.33 |
| 2-1 | 3.11 | 5.62 | 5.46 | 3.24 | 0.06 | 1.31 | 2 |
| 2-2 | 3.08 | 5.45 | 5.47 | 4.06 | 0.07 | 1.27 | 2 |
| 2-3 | 2.15 | 5.92 | 5.45 | 3.65 | 0.05 | 1.34 | 2.5 |
| 2-4 | 4.23 | 5.72 | 5.49 | 3.36 | 0.07 | 1.28 | 2 |
| 2-5 | 3.20 | 5.26 | 5.41 | 2.25 | 0.11 | 1.18 | 2 |
| 2-6 | 2.94 | 5.78 | 5.33 | 1.82 | 0.08 | 1.41 | 3 (Puffy) |
| Average | 3.12 | 5.63 | 5.44 | 3.06 | 0.07 | 1.30 | 2.25 |
| 3-1 | <1.00 | 5.73 | 5.58 | 0.37 | 0.34 | 1.10 | 2.5 (Puffy) |
| 3-2 | 3.30 | 5.52 | 5.61 | 0.50 | 0.28 | 1.09 | 2.5 |
| 3-3 | 1.85 | 5.75 | 5.56 | 0.54 | 0.28 | 1.19 | 2.5 |
| 3-4 | 2.20 | 5.68 | 5.61 | 0.16 | 0.38 | 1.17 | 2 |
| 3-5 | <1.00 | 5.20 | 5.51 | 0.48 | 0.28 | 1.13 | 1 |
| 3-6 | 3.08 | 6.04 | 5.48 | 0.20 | 0.32 | 1.27 | 1 (Very Puffy) |
| Average | 2.07 | 5.65 | 5.56 | 0.38 | 0.31 | 1.16 | 1.92 |
| 4-1 | 2.61 | 5.98 | 5.78 | 0.48 | 0.32 | 2.06 | 2.5 |
| 4-2 | <1.00 | 6.36 | 5.80 | 0.44 | 0.32 | 1.96 | 1.5 |
| 4-3 | 3.48 | 6.11 | 5.80 | 0.54 | 0.35 | 2.38 | 1 |
| 4-4 | 3.15 | 5.11 | 5.73 | 0.36 | 0.33 | 2.43 | 1 |
| 4-5 | 1.90 | 6.15 | 5.70 | 0.79 | 0.27 | 1.95 | 1 |
| 4-6 | 2.87 | 5.73 | 5.64 | 1.72 | 0.31 | 2.20 | 2 |
| Average | 2.50 | 5.91 | 5.74 | 0.72 | 0.32 | 2.16 | 1.5 |

TABLE 5

Odor Score Averages for Each Treatment

| Treatment | Day 26 | Day 30 | Day 41 | Treatment Average |
|---|---|---|---|---|
| 1 | 2.20 | 2.30 | 2.30 | 2.30$^a$ |
| 2 | 1.40 | 1.50 | 2.20 | 1.70$^b$ |
| 3 | 1.70 | 1.80 | 1.90 | 1.80$^b$ |
| 4 | 1.10 | 1.20 | 1.50 | 1.30$^c$ |
| Day Average | 1.60$^{a,1}$ | 1.70$^{a,b,1}$ | 2.00$^{b,2}$ | |

$^{a,b,c}$values within a same row/column lacking a common letter differ (P < 0.05)
$^{1,2}$values within a same row/column lacking a common number differ (P < 0.10)

Based on these tests, it was found that the initial bacterial counts on composite samples of ends and pieces were less than 100/gm. Also, the psychrophilic bacteria counts (PSY) and the mesophilic counts (TPC) appeared to remain relatively constant over time, with the mesophilic counts generally running 2 to 3 logs lower than the psychrophilic counts. One potential reason for this may be that the bacteria were stressed in some way that retards growth. Another factor contributing to these results may be that the levels of carbon dioxide combined with the very low level of residual oxygen (less than 500 ppm) have a detrimental effect on bacterial growth in a barrier lid stock package beyond what is normally associated with carbon dioxide. There was no real difference between aerobic and anaerobic counts that were conducted on 54-day-old extra samples. Additionally, it appears most of the organisms growing are facultative anaerobes that prefer to grow aerobically but are also able to grow under anaerobic conditions.

Differences in meat color were observed between the treatments. The meat in Treatment 1 had a purple color similar to the appearance of vacuum-packaged meat, and the meat in Treatment 1 did bloom back upon opening the packages. The meat in Treatment 2 had a pale pink color, the meat in Treatment 3 had a bright pink color, and the meat in Treatment 4 had a red color. It was observed that the meat in Treatment 4 had an improved color.

The effect of the various treatments on the odor scores of beef strip steaks is shown in greater detail in Table 5. The meat in Treatment 1 (non-enhanced meat packaged with 70% nitrogen and 30% carbon dioxide) had the highest overall odor scores (average of all three sampling dates). More specifically, Treatment 2 produced a significantly lower overall odor score than Treatment 1. Overall odor scores for Treatment 3 were not statistically different from Treatment 2. This shows the addition of other ingredients (salt, phosphate, and rosemary) to Treatment 3 had no significantly noticeable effect on odor intensity compared to solely carbon monoxide (Treatment 2). The meat in Treatment 3, however, did have a significantly lower overall odor score than the meat in Treatment 1. Treatment 4 (containing potassium lactate) had a lower odor score at each sampling date and thus a significantly lower overall odor score than all of the other treatments. As such, it appears the combination of a modified atmosphere containing carbon monoxide along with an enhancer of potassium lactate in the treatment solution produces low odor scores.

In sum, there is no apparent benefit in reducing microbial count, but there is a benefit in reducing odor and puffiness in the packaged meat. This packaging system accordingly enhances color retention and maintains desirable odor.

Another test was performed regarding an enhanced meat product using sodium diacetate as an enhancer. This test involved four treatments of beef strip loins cut into 1-inch steaks as follows: Treatment 1 was a non-enhanced meat; Treatment 2 a meat enhanced with water, sodium tri-poly-phosphate (STPP), salt, and diacetate; Treatment 3 was a meat enhanced with water, potassium lactate, STPP, and salt; and Treatment 4 was a meat enhanced with water, potassium lactate, STPP, salt, and sodium diacetate. After treating the meats, each meat was placed in a barrier lid stock tray, and the packages were then back-flushed with a modified atmosphere including 30% $CO_2$, 69.6% $N_2$ and 0.4% CO and sealed. The samples were stored at about 2° C. to 3° C. and evaluated at 27, 36, and 47 days for odor and other parameters as described above with reference to Tables 2-5. The results of this test, as set forth below in Table 6, show that Treatment 3 and Treatment 4 have the best odor scores.

TABLE 6

Odor Score Averages for Each Treatment

| Treatment | Day 27 | Day 36 | Day 47 | Average |
|---|---|---|---|---|
| 1 | 2.3 | 2.6 | 3.0 | 2.6 |
| 2 | 1.4 | 1.8 | 1.9 | 1.7 |
| 3 | 1.1 | 1.3 | 1.7 | 1.4 |
| 4 | 1.1 | 1.2 | 1.3 | 1.2 |
| Day Average | 1.5 | 1.7 | 2.0 | |

C. Selected Embodiments of Packaging and Shipping Meat Products

Figure 3:
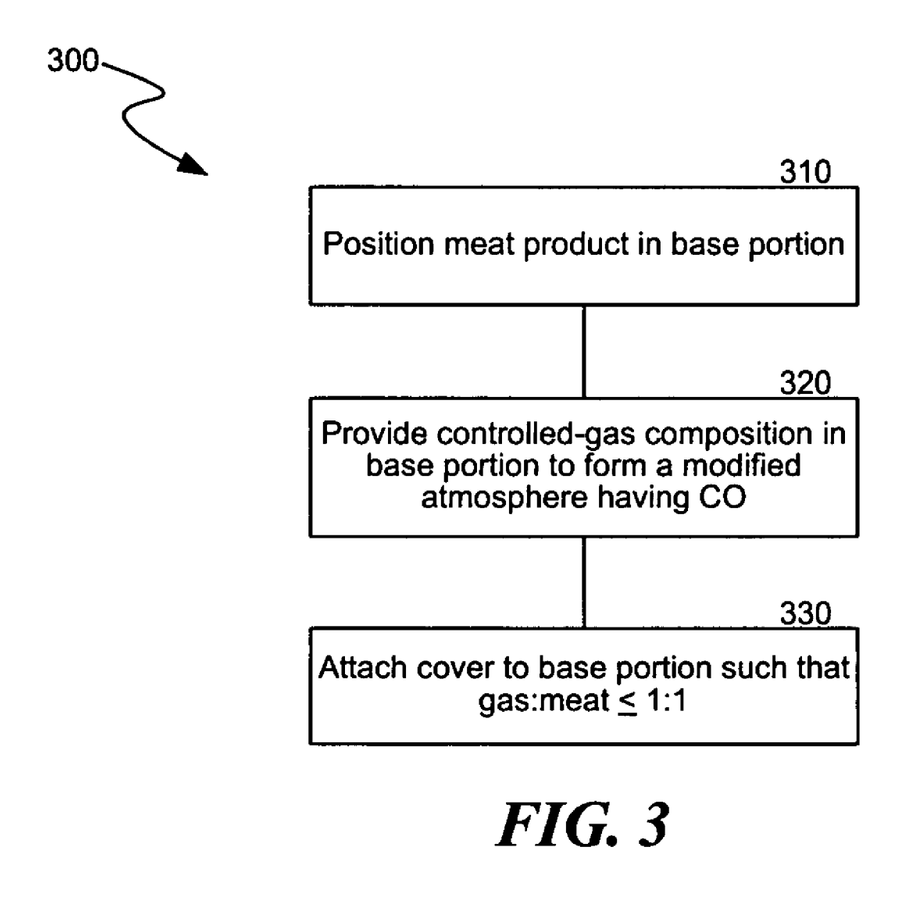
FIG. 3 is a flow chart of a method of packaging a meat product in accordance with an embodiment of the invention.

FIG. 3 is a flow chart illustrating a method 300 for packaging a meat product. In this embodiment, the method 300 includes a first stage 310 comprising positioning a meat product having a first volume in a base portion of a container having a low gas permeability. Suitable materials for the base portion of the container have a gas permeability not greater than approximately 200 cc/m$^2$/24 hrs., and were preferably less than or equal to about 20 cc/m$^2$/24 hrs. The method 300 further includes a second stage 320 comprising providing a controlled-gas composition in the base portion of the container, and a third stage 330 comprising attaching a cover having a low gas permeability to the base portion. The cover and the base portion enclose the meat product and the controlled-gas composition in an enclosure having an interior volume with a modified atmosphere including approximately 0.1% to 30% carbon monoxide in several embodiments, and desirably not more than 10% CO. Additionally, the cover is attached to the base such that the gas:meat volume ratio is not greater than about 1:1. The method 300 can have several different embodiments in which the gas permeability, modified atmosphere, and gas:meat volume ratio can be any of those set forth above, in the Detailed Description.

Figure 4:
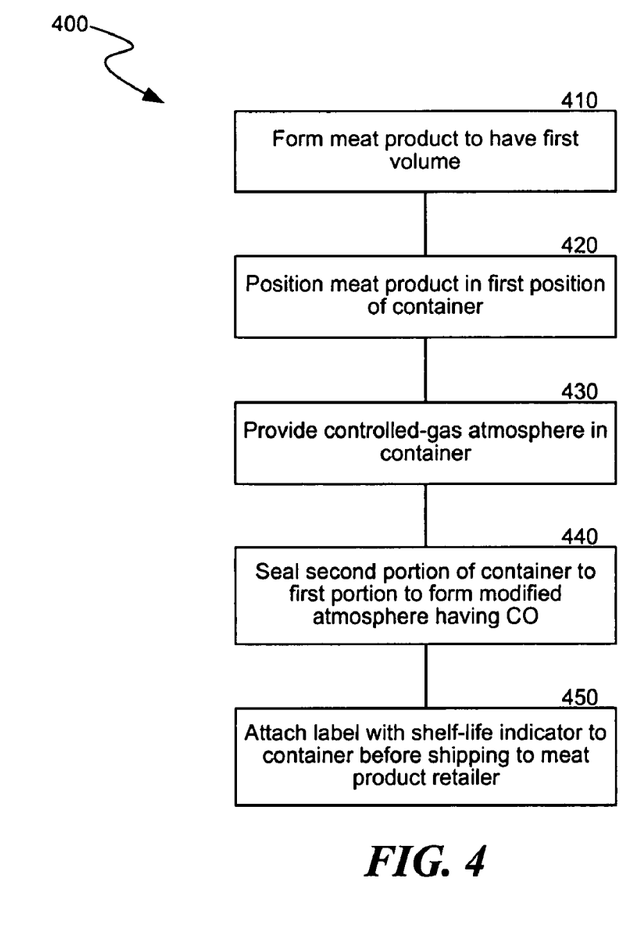
FIG. 4 is a flow chart of a method of packaging a meat product at a packaging location in accordance with an embodiment of the invention.

FIG. 4 is a flow chart of a method of packaging a meat product at a packaging location. One particular embodiment of the method 400 has a first stage 410 comprising forming a meat product to have a first volume and a second stage 420 comprising positioning the meat product in a first portion of a container. The first portion of the container has a low gas permeability to provide a substantial barrier to the transmission of oxygen and/or carbon monoxide into and out of the container. The method 400 further includes a third stage 430 providing a controlled-gas composition in the first portion of the container. The method 400 further includes a fourth stage 440 comprising sealing a second portion of the container to the first portion of the container to form an enclosure containing the meat product and a modified atmosphere including the controlled-gas composition. The second portion of the container also has a low gas permeability, and the modified atmosphere in the enclosure includes carbon monoxide. In several embodiments, the modified atmosphere has less than or equal to about 10% carbon monoxide, but other embodiments can have carbon monoxide in other amounts set forth above. The method 400 further includes a fifth stage 450 comprising imparting to the container an indicator of when a shelf life of the meat product is expected to expire before shipping the packaged meat product to a meat product retailer. The fifth stage 450, more specifically, can include attaching a label to the container that has an indicator of when the shelf life of the meat product is expected to expire, or printing or stamping a shelf life indicator directly onto the first portion and/or the second portion of the container.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments. Additionally, the packaged products described above can include a meat product and a non-meat product (e.g., a vegetable or bread), and these packaged meat/non-meat products can have gas:solids volume ratios and modified atmospheres similar to or the same as those described above. The invention is accordingly not limited except as by the appended claims.

We claim:

1. A packaged meat product, comprising:
    a container having a low gas permeability and an enclosed interior volume, the container comprising a tray and a low gas permeable sealing film bonded to the tray, and wherein the tray and the low gas permeable sealing film define the enclosed interior volume;
    a meat product enclosed within the interior volume of the container, the meat product having a first volume less than the interior volume such that the meat product is spaced apart from the sealing film by a head space, and wherein the low gas permeable sealing film is juxtaposed with the meat product without any intervening film between the meat product and the low gas permeable sealing film; and
    a modified atmosphere comprising about 0.1% to about 30% carbon monoxide within the interior volume of the container, wherein the modified atmosphere has a second volume such that a volume ratio of the second volume to the first volume is not greater than approximately 1:1.

2. The packaged meat product of claim 1 wherein:
    the tray has a generally fixed volume and a gas permeability not greater than about 20 cc/m²/24 hours; and
    the low gas permeable sealing film has a gas permeability not greater than about 20 cc/m²/24 hours and is generally transparent.

3. The packaged meat product of claim 2 wherein the tray has a volume at least approximately equal to the enclosed interior volume.

4. The packaged meat product of claim 3 wherein the low gas permeable sealing film has a unitary construction.

5. The packaged meat product of claim 3 wherein the low gas permeable sealing film has a single ply.

6. The packaged meat product of claim 1 wherein the modified atmosphere comprises between about 0.4% CO to about 1.2% CO.

7. The packaged meat product of claim 6 wherein the modified atmosphere has not more than 1.0% $O_2$.

8. The packaged meat product of claim 6 wherein the modified atmosphere has not more than 0.2% $O_2$.

9. The packaged meat product of claim 1 wherein the modified atmosphere comprises about 0.4% CO to about 0.5% CO.

10. The packaged meat product of claim 1 wherein the modified atmosphere comprises approximately 0.48% CO.

11. The packaged meat product of claim 1 wherein the volume ratio of the second volume to the first volume is not greater than about 0.9:1.

12. The packaged meat product of claim 1 wherein the volume ratio of the second volume to the first volume is about 0.1:1 to about 0.8:1.

13. The packaged meat product of claim 1 wherein the volume ratio of the second volume to the first volume is about 0.3:1 to about 0.8:1.

14. The packaged meat product of claim 13 wherein the enhancer comprises a lactate.

15. The packaged meat product of claim 13 wherein the enhancer comprises a diacetate.

16. The packaged meat product of claim 1 wherein the meat product is selected from the group consisting of beef, pork, mutton, poultry, lamb, veal, and fish.

17. The packaged meat product of claim 1 wherein the meat product is an enhanced meat product including a meat portion and an enhancer.

18. The packaged meat product of claim 17 wherein the meat product is treated with a solution including lactate resulting in 4.80% or less lactate of the weight of the treated meat product.

19. The packaged meat product of claim 17 wherein the meat product is treated with a solution including lactate salts, salts of organic acid acidulants, or salts of inorganic acid acidulants, wherein the salts of organic acid acidulants are acetic, citric, lactic, or malic, and wherein the salts of inorganic acid acidulants are phosphoric or hydrochloric.

20. The packaged meat product of claim 19 wherein the modified atmosphere includes 1.20% or less carbon monoxide, 0 to 80% nitrogen, and 20 to 100% carbon dioxide.

21. The packaged meat product of claim 1 wherein the modified atmosphere has not more than 1.0% $O_2$.

22. The packaged meat product of claim 1 wherein the modified atmosphere has not more than 0.2% $O_2$.

23. The packaged meat product of claim 1 wherein the tray includes a rim and the low gas permeable sealing film is bonded directly to the rim.

24. The packaged meat product of claim 23 wherein the rim comprises a flange.

25. The packaged meat product of claim 1 wherein the container is one of a plurality of separately packaged meat products in a shipping container, the container including an indicator displaying a desired shelf life of the meat product.

26. The packaged meat product of claim 1 wherein the tray, the sealing film, and the modified atmosphere are configured and arranged to maintain substantial enclosure of the modified atmosphere while the meat product is displayed for sale at a retailer.

27. The packaged meat product of claim 1 wherein the head space surrounds a top and sides of the meat product.

28. A packaged meat product, comprising:
    a low gas permeable container comprising a tray and a barrier film bonded directly to the tray, wherein the barrier film is a low gas permeable film, and wherein the tray and the barrier film define an interior volume;
    a first volume of meat product enclosed within the interior volume such that the barrier film is spaced apart from the meat product by a gap that defines a head space without non-gaseous material between the meat product and the barrier film; and
    a modified atmosphere comprising about 0.1% to about 30% carbon monoxide in the head space within the interior volume of the container, wherein the modified atmosphere has a second volume such that a volume ratio of the second volume to the first volume is not greater than approximately 1:1.

29. The packaged meat product of claim 28 wherein the barrier film has a unitary construction.

30. The packaged meat product of claim 28 wherein the barrier film has a single ply.

31. The packaged meat product of claim 28 wherein the modified atmosphere comprises about 0.4% CO to about 0.5% CO.

32. The packaged meat product of claim 28 wherein the modified atmosphere comprises approximately 0.48% CO.

33. The packaged meat product of claim 28 wherein the volume ratio of the second volume to the first volume is about 0.1:1 to about 0.8:1.

34. The packaged, meat product of claim 28 wherein the volume ratio of the second volume to the first volume is about 0.3:1 to about 0.8:1.

35. A packaged meat product, comprising:
a container comprising a tray having a rim, a single film attached directly to the rim, and an interior volume defined by the tray and the single film, and wherein the single film comprises a low gas permeable sealing film;
a meat product enclosed within the interior volume of the container, and the meat product having a first volume less than the interior volume such that the meat product is spaced apart from the single film by a head space; and
a modified atmosphere comprising about 0.1% to about 30% carbon monoxide in the head space within the interior volume of the container, wherein the modified atmosphere has a second volume such that a volume ratio of the second volume to the first volume is not greater than approximately 1:1.

36. The packaged meat product of claim 35 wherein the low gas permeable sealing film has a unitary construction.

37. The packaged meat product of claim 35 wherein the low gas permeable sealing film has a single ply.

38. The packaged meat product of claim 35 wherein the modified atmosphere comprises about 0.4% CO to about 0.5% CO.

39. The packaged meat product of claim 35 wherein the modified atmosphere comprises approximately 0.48% CO.

40. The packaged meat product of claim 35 wherein the volume ratio of the second volume to the first volume is about 0.1:1 to about 0.8:1.

41. The packaged meat product of claim 35 wherein the volume ratio of the second volume to the first volume is about 0.3:1 to about 0.8:1.

42. A packaged meat product, comprising:
a container comprising a tray, a low gas permeable sealing film bonded directly to the tray, and an interior volume defined by the tray and the low gas permeable sealing film;
a meat product enclosed within the interior volume of the container, and the meat product having a first volume less than the interior volume such that the low gas permeable sealing film is directly juxtaposed with the meat product; and
a modified atmosphere comprising about 0.1% to about 30% carbon monoxide within the interior volume of the container, wherein the modified atmosphere has a second volume such that a volume ratio of the second volume to the first volume is approximately 0.1:1 to approximately 0.8:1.

43. The packaged meat product of claim 42 wherein the low gas permeable sealing film has a unitary construction.

44. The packaged meat product of claim 42 wherein the low gas permeable sealing film has a single ply.

45. The packaged meat product of claim 42 wherein the modified atmosphere comprises about 0.4% CO to about 0.5% CO.

46. The packaged meat product of claim 42 wherein the modified atmosphere comprises approximately 0.48% CO.

47. The packaged meat product of claim 42 wherein the volume ratio of the second volume to the first volume is about 0.3:1 to about 0.8:1.

48. The packaged meat product of claim 42 wherein the volume ratio of the second volume to the first volume is about 0.5:1.

49. A packaged meat product, comprising:
a container comprising a tray, a low gas permeable sealing film bonded directly to the tray, and an interior volume defined by the tray and the low gas permeable sealing film;
a meat product enclosed within the interior volume of the container, and the meat product having a first volume less than the interior volume such that the low gas permeable sealing film is spaced apart from the meat product;
a modified atmosphere comprising about 0.1% to about 30% carbon monoxide within the interior volume of the container, wherein the modified atmosphere has a second volume such that a volume ratio of the second volume to the first volume is not greater than approximately 1:1; and
wherein the tray, the low gas permeable sealing film and the modified atmosphere are configured to maintain enclosure of the modified atmosphere while the meat product is displayed for sale at a retailer.

50. The packaged meat product of claim 49 wherein the low gas permeable sealing film has a unitary construction.

51. The packaged meat product of claim 49 wherein the low gas permeable sealing film has a single ply.

52. The packaged meat product of claim 49 wherein the modified atmosphere comprises about 0.4% CO to about 0.5% CO.

53. The packaged meat product of claim 49 wherein the modified atmosphere comprises approximately 0.48% CO.

54. The packaged meat product of claim 49 wherein the volume ratio of the second volume to the first volume is about 0.1:1 to about 0.8:1.

55. The packaged meat product of claim 49 wherein the volume ratio of the second volume to the first volume is about 0.3:1 to about 0.8:1.

56. A packaged meat product, comprising:
a container comprising a tray, a low gas permeable sealing film bonded directly to the tray, an interior volume defined by the tray and the low gas permeable sealing film, and at least one of a sell-by and use-by date on at least one of the tray and the low gas permeable sealing film;
a meat product enclosed within the interior volume of the container, and the meat product having a first volume less than the interior volume such that the low gas permeable sealing film is spaced apart from the meat product by a head space; and
a modified atmosphere comprising about 0.1% to about 30% carbon monoxide in the head space within the interior volume of the container, wherein the modified atmosphere has a second volume such that a volume ratio of the second volume to the first volume is not greater than approximately 1:1, wherein the modified atmosphere and the head space are configured such that the meat product has an acceptable color for display at a retailer until the sell-by or use-by date.

* * * * *